United States Patent
Zhu (10) Patent No.: US 10,348,750 B2
(45) Date of Patent: Jul. 9, 2019

(54) TCP BYPASS INTERDICTION METHOD AND DEVICE

(71) Applicant: HANGZHOU DPTECH TECHNOLOGIES CO., LTD., Hangzhou (CN)

(72) Inventor: Liang Zhu, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 284 days.

(21) Appl. No.: 15/403,037

(22) Filed: Jan. 10, 2017

(65) Prior Publication Data
US 2017/0201544 A1 Jul. 13, 2017

(30) Foreign Application Priority Data
Jan. 12, 2016 (CN) .......................... 2016 1 0018371

(51) Int. Cl.
H04L 29/06 (2006.01)
(52) U.S. Cl.
CPC ...... H04L 63/1425 (2013.01); H04L 63/1416 (2013.01); H04L 63/166 (2013.01);
(Continued)
(58) Field of Classification Search
None
See application file for complete search history.

(56) References Cited
U.S. PATENT DOCUMENTS

| | | | |
|---|---|---|---|
| 7,404,210 B2 * | 7/2008 | Lin | H04L 63/1458 370/392 |
| 7,613,193 B2 * | 11/2009 | Swami | H04W 12/12 370/349 |

(Continued)

FOREIGN PATENT DOCUMENTS

| | | | |
|---|---|---|---|
| CN | 101902440 A | 12/2010 | |
| CN | 101986648 A | 3/2011 | |

OTHER PUBLICATIONS

State Intellectual Property Office of the People's Republic of China, Office Action and Search Report Issued in Application No. 201610018371.1, dated Aug. 2, 2018, 17 pages. (Submitted with Partial Translation).
Postel, J., "Transmission Control Protocol: DARPA Internet Program—Protocol Specification," Information Sciences Institute, University of Southern California, Sep. 1981, 94 pages.
(Continued)

Primary Examiner — Michael R Vaughan
(74) Attorney, Agent, or Firm — McCoy Russell LLP (57) ABSTRACT

A TCP bypass interdiction method and device are provided. The method comprises: a DPI device between a client terminal and a service terminal acquiring a MSS negotiation value on the basis of a TCP handshake packet; when a suspicious packet is monitored, the DIP device constructing an RST packet according to the suspicious packet and the MSS negotiation value. The RST packet comprises a source direction RST packet and target direction RST packets. The receiving terminal of the source direction RST packet is the same with the transmitting terminal of the suspicious packet. The receiving terminals of the target direction RST packets are the same with the receiving terminal of the suspicious packet. SEQ values of the target direction RST packets are sequentially increased by at least one MSS negotiation value. The method comprises the DPI device transmitting the RST packet to the client terminal and the service terminal respectively.

18 Claims, 2 Drawing Sheets

(52) U.S. Cl.
CPC .............. *H04L 67/42* (2013.01); *H04L 69/16* (2013.01); *H04L 69/163* (2013.01); *H04L 69/22* (2013.01)

(56) References Cited

U.S. PATENT DOCUMENTS

| | | | | |
|---|---|---|---|---|
| 9,288,227 | B2* | 3/2016 | Rao | H04L 63/1458 |
| 2005/0021999 | A1* | 1/2005 | Touitou | H04L 63/1458 |
| | | | | 726/11 |
| 2006/0230129 | A1* | 10/2006 | Swami | H04L 63/1458 |
| | | | | 709/223 |
| 2011/0202972 | A1* | 8/2011 | Jiang | H04L 63/08 |
| | | | | 726/3 |

OTHER PUBLICATIONS

Clark, D., "Window and Acknowledgment Strategy in TCP," MIT Laboratory for Computer Science, Computer Systems and Communications Group, Jul. 1982, 21 pages.
Postel, J., "The TCP Maximum Segment Size and Related Topics," Network Working Group, Request for Comments: 879, Nov. 1983, 12 pages.
Zweig, J. et al., "TCP Alternate Checksum Options," Network Working Group, Request for Comments: 1146, Mar. 1990, 6 pages.
State Intellectual Property Office of the People's Republic of China, Office Action and Search Report Issued in Application No. 201610018371.1, dated Mar. 14, 2019, 16 pages.

* cited by examiner

TCP BYPASS INTERDICTION METHOD AND DEVICE

CROSS-REFERENCE TO RELATED APPLICATIONS

The present application claims priority to Chinese Patent Application No. 201610018371.1, filed on Jan. 12, 2016, the entire contents of which are hereby incorporated by reference for all purposes.

TECHNICAL FIELD

The present application relates to a TCP (transmission control protocol) bypass interdiction method and device in the field of communications.

BACKGROUND

After a TCP connection is established between a service terminal and a client terminal, an audio monitor can be deployed between the service terminal and the client terminal. When the audio monitor monitors a suspicious packet, the audio monitor can transmit a constructed interdiction packet—RST (reset) packet to the client terminal or the service terminal. After the client terminal or the service terminal receives the constructed RST packet, the client terminal or the service terminal will disconnect the TCP connection having been established, so as to achieve the object of interdicting the attack of the suspicious packet.

The RST packet is probably transmitted to the client terminal or the service terminal later than the suspicious packet. Therefore, after the client terminal or the service terminal receives the RST packet, the client terminal or the service terminal will not process the RST packet because the RST packet is an outdated packet, such that the RST packet cannot achieve the object of interdicting the attack of the suspicious packet.

SUMMARY

In accordance with one aspect of the present disclosure, a TCP (transmission control protocol) bypass interdiction method is provided. The TCP bypass interdiction method comprises: a DPI (deep packet inspection) device located between a client terminal and a service terminal acquiring an MSS (maximum segment size) negotiation value on the basis of a TCP handshake packet transmitted between the client terminal and the service terminal; when a suspicious packet is monitored, the DIP device constructing an RST packet according to the suspicious packet and the MSS negotiation value. The RST packet comprises a source direction RST packet and a plurality of target direction RST packets. The receiving terminal of the source direction RST packet is the same with the transmitting terminal of the suspicious packet. The receiving terminals of the plurality of target direction RST packets are the same with the receiving terminal of the suspicious packet. SEQ values of the plurality of target direction RST packets are sequentially increased by at least one MSS negotiation value. The method further comprises the DPI device transmitting the RST packet to the client terminal and the service terminal respectively.

In accordance with another aspect of the present disclosure, a TCP bypass interdiction device is provided. The TCP bypass interdiction device located between a client terminal and a service terminal and comprising a processor executing the following operations by reading machine executable instructions corresponding to a TCP bypass interdiction from a machine readable storage medium and executing the machine executable instruction: acquiring an MSS negotiation value on the basis of a TCP handshake packet transmitted between the client terminal and the service terminal; when a suspicious packet is monitored, constructing an RST packet according to the suspicious packet and the MSS negotiation value, the RST packet including a source direction RST packet and a plurality of target direction RST packets, the receiving terminal of the source direction RST packet being the same with the transmitting terminal of the suspicious packet, the receiving terminal of the plurality of target direction RST packets being the same with the receiving terminal of the suspicious packet, and the SEQ values of the plurality of target direction RST packets being sequentially increased by at least one MSS negotiation value; and transmitting the RST packet to the client terminal and the service terminal respectively.

DETAILED DESCRIPTION

The exemplary embodiments will be described in details hereafter, the examples thereof are as shown in the drawings. When the descriptions hereafter refer to the drawings, unless otherwise stated, the same number in different drawings represents the same or similar elements. The implementation modes described in the following exemplary embodiments do not represent all the implementation modes consistent with the present application. On the contrary, those implementation modes are only examples of the device and the method consistent with one or more aspects of the present application as described in claims.

The terms used in the present application are only for the purpose of describing a specific embodiment, but not for restricting the present application. The singular forms "a", "an" and "the" used in the present application and claims are also intended to comprise plurality forms, unless other meanings are clearly indicated in the context. It should be also understood that the term "and/or" used in the text is intended to comprise any one or all possible combinations of one or more relevant listed items.

It should be understood that although the present application may use the terms "first", "second", "third" and the like to describe various information, the terms are only used to distinguish the same type of information from each other, but not to restrict the information. For example, under the premise without deviating from the scope of the present application, first information can also called as second information; similarly, second information can also called as first information. Depending on the context, the word "if" used in the text can be explained as "when" or "while" or "in response to determining".

Figure 1:
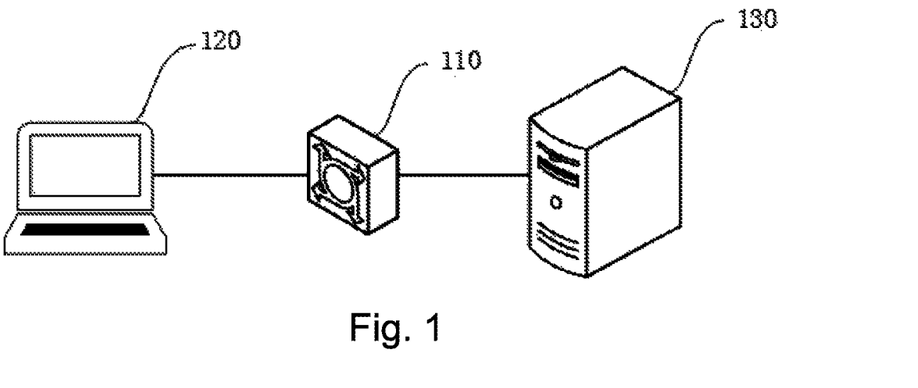
FIG. 1 is an application scenario diagram of TCP bypass interdiction according to one embodiment.

With reference to FIG. 1, a DPI (deep packet inspection) device 110 is connected to a client terminal 120 and a service terminal 130, and is located between the client terminal 120 and the service terminal 130. The DIP device 110 may be a bypass audio monitor. When a suspicious packet transmitted between the client terminal 120 and the service terminal 130 is monitored, the DIP device 110 constructs an interdiction packet—RST packet, and transmits the constructed RST packet to the client terminal 120 or the service terminal 130, so as to achieve the object of interdicting the attack of the suspicious packet.

When a TCP connection is established between the client terminal 120 and the service terminal 130, the DPI device 110 acquires a MSS (maximum segment size) negotiation value from handshake packets of the client terminal 120 and the service terminal 130. The MSS denotes the maximum segment size of a packet that a TCP buffer memory can receive. When the suspicious packet transmitted between the client terminal 120 and the service terminal 130 is discovered, the DIP device 110 constructs the RST packet according to the suspicious packet and the MSS negotiation value. After the RST packet is successfully constructed, the DIP device 110 transmits the constructed RST packet to the client terminal 120 and the service terminal 130 to interdict the suspicious packet. Therefore, the "not outdated" probability of the RST packet is increased, thus the interdiction success rate is increased.

Figure 2:
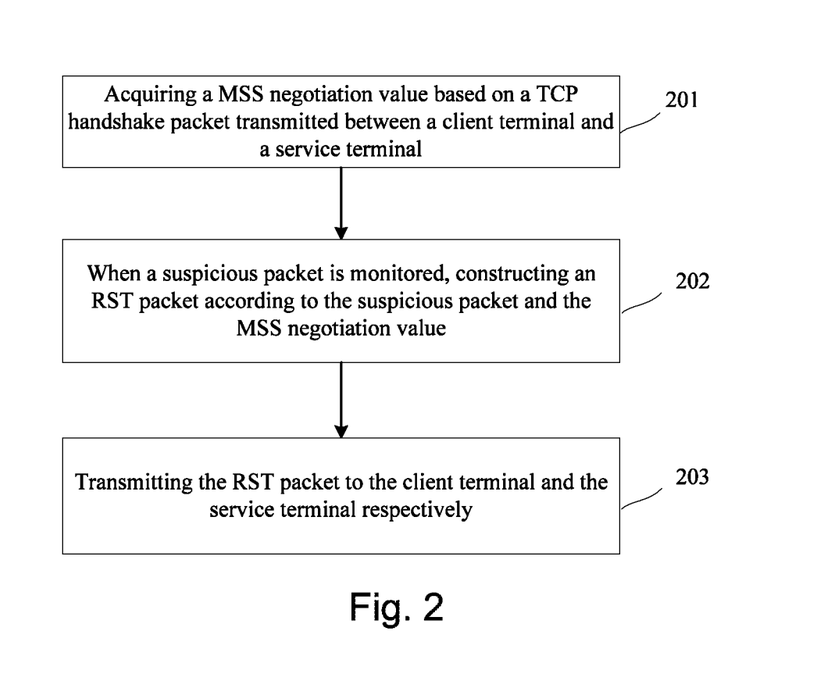
FIG. 2 is a flow chart of a TCP bypass interdiction method according to one embodiment.

With reference to FIG. 2 which is a flow chart of a TCP bypass interdiction method according to one embodiment. The example of the TCP bypass interdiction method in FIG. 2 may be applied on the DPI device as shown in FIG. 1. As shown in FIG. 2, the TCP bypass interdiction method includes the following steps:

Step 201, the DPI device located between the client terminal and the service terminal acquires the MSS negotiation value on the basis of the TCP handshake packet transmitted between the client terminal and the service terminal.

When the TCP connection is established between the client terminal and the service terminal, the DPI device acquires the MSS negotiation value on the basis of the acquired TCP handshake packet transmitted between the client terminal and the service terminal. The DPI device may monitor the handshake packet when the client terminal and the service terminal shake hands for three times. For example, the DPI device may acquire a first MSS value from the monitored first handshake packet, SYN packet, transmitted to the service terminal by the client terminal, acquire a second MSS value from the monitored second handshake packet, ACK packet, transmitted to the client terminal by the service terminal, and then select the smaller or greater one of the first MSS value and the second MSS value as the MSS negotiation value.

In one example, supposing that the first MSS value acquired by the DPI device from the first handshake packet is 1400, and the second MSS value acquired from the second handshake packet is 1200, the DPI device compares the first MSS value with the second MSS value, and selects the smaller or greater one of the two MSS values as the MSS negotiation value. Therefore, the DPI device selects 1200 or 1400 as the MSS negotiation value.

After the MSS negotiation value is acquired, the DPI device may store the MSS negotiation value in a session table which may be located in the DPI device. The session table may include a quintuple information of a packet and a corresponding MSS negotiation value.

In one example, supposing that the session table is as shown in table 1 as follows (table 1 only shows a part of the information of the session table):

TABLE 1

| Source IP address | Target IP address | Source port | Target port | Protocol | MSS negotiation value |
|---|---|---|---|---|---|
| 1.1.1.2 | 3.2.1.4 | 30 | 50 | TCP | 1200 |
| 1.2.1.2 | 2.2.4.1 | 20 | 60 | TCP | 1000 |
| 1.2.3.5 | 3.2.1.5 | 15 | 75 | TCP | 1400 |

Step 202, when the suspicious packet is monitored, the DIP device constructs the RST packet according to the suspicious packet and the MSS negotiation value.

After the TCP connection is established between the client terminal and the service terminal, the DPI device monitors the data packet transmitted between the client terminal and the service terminal. When the suspicious packet is monitored, the DIP device constructs the RST packet according to the suspicious packet and the MSS negotiation value. The RST packet is used to interdict the suspicious packet.

In one example, when the client terminal or the service terminal receives the RST packet, the client terminal or the service terminal checks an ACK bit of the RST packet. When the ACK bit of the RST packet is not 0, the client terminal or the service terminal checks an ACK_SEQ value of the RST packet; and when the ACK bit of the RST packet is 0, the client terminal or the service terminal does not check the ACK_SEQ value of the RST packet after checking the ACK bit of the RST packet.

From the above example, when constructing an RST packet, the ACK bit of the RST packet can be set as 0. The RST packet can be used to interdict the suspicious packet, therefore, the RST bit of the RST packet is set as 1.

Then, the RST packets transmitted to the client terminal and the service terminal are respectively constructed according to the suspicious packet and the MSS negotiation value.

The RST packets include a source direction RST packet and a target direction RST packet. The receiving terminal of the source direction RST packet is the same with the transmitting terminal of the suspicious packet. For example, when the client terminal transmits the suspicious packet to the service terminal, the RST packet transmitted to the client terminal by the DPI device is referred as to the source direction RST packet. The receiving terminal of the target direction RST packet is the same with the receiving terminal of the suspicious packet. For example, when the client terminal transmits the suspicious packet to the service terminal, the RST packet transmitted to the service terminal by the DPI device is referred as to the target direction RST packet. The construction processes of the source direction RST packet and the target direction RST packet are slightly different, which will be respectively introduced hereafter.

When the receiving terminal of the suspicious packet is the same with the transmitting terminal of the RST packet required to be constructed, the source direction RST packet is constructed according to the suspicious packet and the MSS negotiation value. When the source direction RST packet is constructed, the ACK bit of the source direction RST packet is set as 0, and the RST bit is set as 1; then, a SEQ value of the source direction RST packet is set to be equal to the ACK_SEQ value of the suspicious packet. After the above settings of the source direction RST packet are completed, the other parts are set to be same with the suspicious packet.

When the receiving terminal of the suspicious packet is the same with the receiving terminal of the RST packet required to be constructed, the target direction RST packet is constructed according to the suspicious packet and the MSS negotiation value. The target direction RST packet may include a plurality of RST packets, and the SEQ values of the plurality of target direction RST packets are sequentially increased by at least one MSS negotiation value. For example, when the target direction RST packet is constructed, the ACK bits of all the target direction RST packets are set as 0, and the RST bits are set as 1; then, the SEQ value of the first target direction RST packet is set to be the sum of the ACK_SEQ value of the suspicious packet and a TCP load length value of the suspicious packet; the SEQ value of the second target direction RST packet is set to be the sum of the SEQ value of the first target direction RST packet and at least one MSS negotiation value; the SEQ value of the third target direction RST packet is set to be the sum of the SEQ value of the second target direction RST packet and at least one MSS negotiation value. By analogy, the SEQ value of each target direction RST packet increases at least one more MSS negotiation value than that of the previous target direction RST packet. After the SEQ values of all the target direction RST packets are set, the other parts of all the target direction RST packets may be set to be same with the suspicious packet.

Certainly, the SEQ value of each target direction RST packet may be linearly increased.

In one example, the SEQ value of each target direction RST packet may be linearly increased by one MSS negotiation value.

From the above process, in one example, when the suspicious packet is a packet transmitted by the client terminal, a plurality of target direction RST packets the SEQ values of which are sequentially increased by at least one MSS negotiation value are transmitted to the service terminal, and the source direction RST packet the SEQ value of which is the same with the ACK_SEQ value of the suspicious packet is transmitted to the client terminal.

In another example, when the suspicious packet is a packet transmitted by the service terminal, the source direction RST packet the SEQ value of which is the same with the ACK_SEQ value of the suspicious packet is transmitted to the service terminal, and the plurality of target direction RST packets the SEQ values of which are sequentially increased by at least one MSS negotiation value are transmitted to the client terminal.

Step 203, the RST packet is transmitted to the client terminal and the service terminal respectively to interdict the suspicious packet.

For example, when the suspicious packet is a packet transmitted by the client terminal, the plurality of target direction RST packets the SEQ values of which are sequentially increased by at least one MSS negotiation value are transmitted to the service terminal. When the suspicious packet is a packet transmitted by the service terminal, the plurality of target direction RST packets the SEQ values of which are sequentially increased by at least one MSS negotiation value are transmitted to the client terminal.

After the RST packet is constructed according to the suspicious packet and the MSS negotiation value, the RST packet is transmitted to the client terminal and the service terminal respectively to interdict the suspicious packet.

When the suspicious packet is a packet transmitted to the service terminal by the client terminal, the first target direction RST packet is transmitted to the service terminal, and the first source direction RST packet is transmitted to the client terminal.

When the suspicious packet is a packet transmitted to the client terminal by the service terminal, the second source direction RST packet is transmitted to the service terminal, and the second target direction RST packets are transmitted to the client terminal. The number of the second target direction RST packets may be greater than the number of the first target direction RST packets.

In one example, according to project empirical values, the number of the first target direction RST packets may be 3, and the SEQ value of each first target direction RST packet increases at least one more MSS negotiation value than that of the previous first target direction RST packet. The number of the second target direction RST packets may be 5, and the SEQ value of each second target direction RST packet increases at least one more MSS negotiation value than that of the previous second target direction RST packet.

A TCP bypass interdiction method is provided. After acquiring a TCP handshake packet transmitted between the client terminal and the service terminal, the DPI device acquires the MSS negotiation value from the acquired TCP handshake packet. When the suspicious packet is monitored, the DPI device constructs the RST packet according to the MSS negotiation value and the suspicious packet, and then transmits the RST packet to the client terminal and the service terminal respectively to interdict the suspicious packet. Because a plurality of the RST packets are transmitted to the client terminal and the service terminal respectively, so the problem of low interdiction success rate is effectively solved.

For example, when the TCP connection is established between the client terminal and the service terminal, the DPI device acquires the first MSS value according to the SYN packet transmitted to the service terminal from the client terminal, and then acquires the second MSS value according to the ACK packet transmitted to the client terminal from the service terminal. After the first MSS value and the second MSS value are acquired, the DPI device selects the smaller or greater one of the two MSS values as the MSS negotiation value.

After the MSS negotiation value is determined, the DPI device may store the MSS negotiation value in the session table preset therein. When the MSS negotiation value is required, the MSS negotiation value is acquired from the session table. The specific information of the session table is shown in table 1.

When the suspicious packet is monitored, the DPI device acquires the corresponding MSS negotiation value from the session table according to the packet information of the suspicious packet, such as the quintuple information and the like.

After the MSS negotiation value is acquired, the DIP device constructs the RST packet according to the suspicious packet and the MSS negotiation value to interdict the suspicious packet.

The RST packet includes the source direction RST packet and the target direction RST packet. The receiving terminal of the source direction RST packet is the same with the transmitting terminal of the suspicious packet; the receiving terminal of the target direction RST packet the same with the receiving terminal of the suspicious packet. It should be noted that the target direction RST packet may be plural, and the SEQ values of the plurality of target direction RST packets are sequentially increased by at least one MSS negotiation value.

When the source direction RST packet is constructed, in order to ensure the source direction RST packet to be quickly identified by the client terminal or the service terminal to play the suspicious packet interdiction effect thereof, the DPI device sets the ACK bit of the source direction RST packet as 0, and sets the RST bit as 1; then, the DPI device sets the SEQ value of the source direction RST packet to be equal to the ACK_SEQ value of the suspicious packet. After the above settings are completed, the other content of the source direction RST packet may be set to be consistent with the suspicious packet.

When the target direction RST packet is constructed, in order to ensure the target direction RST packet to be quickly identified by the client terminal or the service terminal to play the suspicious packet interdiction effect thereof, the DPI device sets the ACK bit of the target direction RST packet as 0, and sets the RST bit as 1; then, the DPI device sets the SEQ value of the first target direction RST packet to be equal to the sum of the ACK_SEQ value of the suspicious packet and the TCP load length value of the suspicious packet. After the above settings are completed, the other content of the first target direction RST packet may be set to be consistent with the suspicious packet.

After the first target direction RST packet is set successfully, the second target direction RST packet is set. The DPI device sets the SEQ value of the second target direction RST packet to be equal to the sum of the SEQ value of the first target direction RST packet and at least one MSS negotiation value. After the above settings are completed, the ACK bit of the second target direction RST packet is set as 0, and the other content may be set to be consistent with the suspicious packet. After the second target direction RST packet is set successfully, the third target direction RST packet is set. Similarly, the SEQ value of the third target direction RST packet increases at least one more MSS negotiation value than that of the second target direction RST packet, and other content may be consistent with the second target direction RST packet.

It should be noted that the SEQ values of the plurality of target direction RST packets may be linearly increased. For example, the SEQ values of the target direction RST packets may be linearly increased by one MSS negotiation value.

The target direction RST packet may be plural, for example, three target direction RST packets.

After the RST packet is constructed, the RST packet is transmitted to the client terminal and the service terminal respectively to interdict the suspicious packet.

In one example, the suspicious packet may be an uplink packet transmitted to the service terminal from the client terminal. In such case, after the RST packet is constructed, the DPI device may transmit the first target direction RST packet to the service terminal, and transmit the first source direction RST packet to the client terminal. The number of the first target direction RST packets may be three according to project empirical values.

In another example, the suspicious packet may be a downlink packet transmitted to the client terminal from the service terminal. In such case, after the RST packet is constructed, the DPI device may transmit the second target direction RST packet to the service terminal, and transmit the second source direction RST packet to the client terminal. The number of the second target direction RST packets may be greater than the number of the first target direction RST packets, for example, the number of the second target direction RST packets may be five according to project empirical values.

Corresponding to the above TCP bypass interdiction method, a TCP bypass interdiction device is provided.

Figure 3:
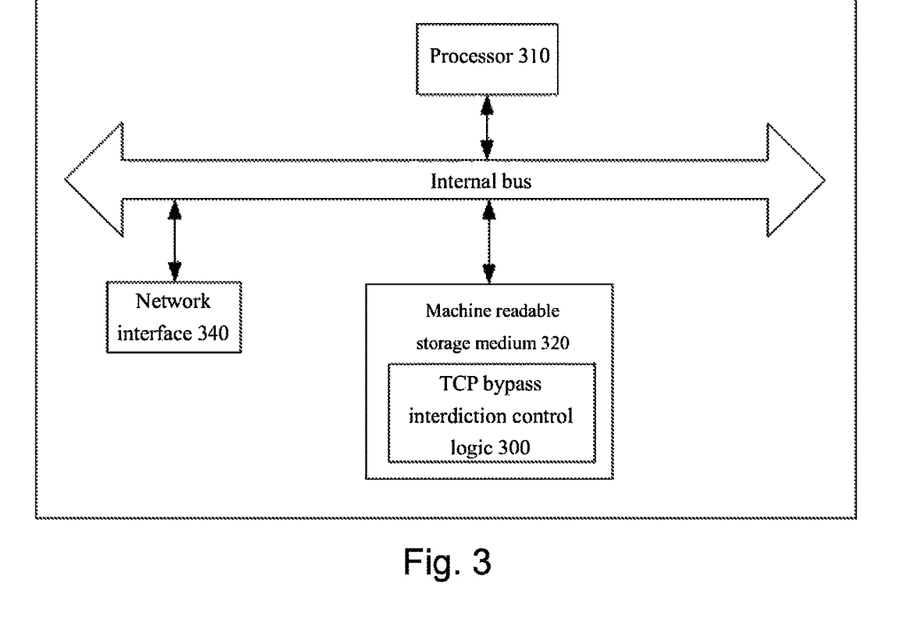
FIG. 3 is a hardware structure diagram of a TCP bypass interdiction device according to one embodiment.

The specific application of the TCP bypass interdiction device may be a DPI device. The TCP bypass interdiction device may be realized via software, or hardware, or the combination of software and hardware. As shown in FIG. 3 which is a hardware structure diagram of the TCP bypass interdiction device in accordance with an embodiment, the device includes a processor 310 and a machine readable storage medium 320. The processor 310 and the machine readable storage medium 320 are usually connected to each other via an internal bus. In other possible implementation modes, the device possibly further includes a network interface 340, so as to communicate with other devices or components. The device usually further includes other hardware, such as a forwarding chip for processing a packet and the like.

In different examples, the machine readable storage medium 320 may be a RAM (random access memory), a volatile memory, a non-volatile memory, a flash memory, a memory drive (e.g. a hard disk drive), a solid hard disk, any type of memory disks (e.g. CD, DVD and the like), or similar storage medium, or the combination thereof.

Figure 4:
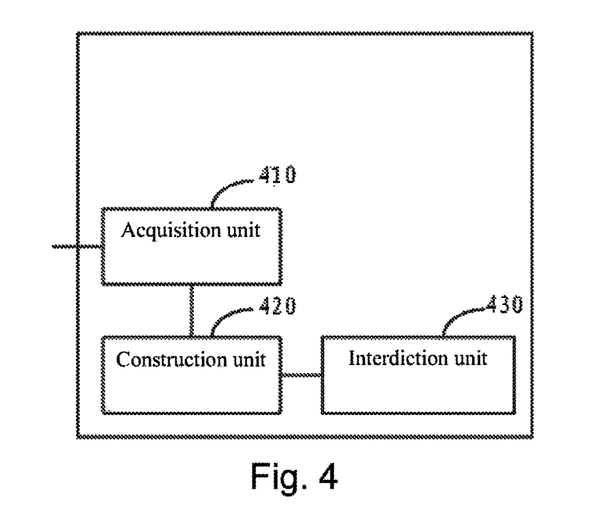
FIG. 4 is a schematic module diagram of a TCP bypass interdiction control logic of the TCP bypass interdiction device according to one embodiment.

Further, the machine readable storage medium 320 stores machine executable instructions corresponding to a TCP bypass interdiction control logic 300. Divided according to the function, the TCP bypass interdiction control logic 300 includes an acquisition unit 410, a construction unit 420 and an interdiction unit 430 as shown in FIG. 4.

The acquisition unit 410 is configured to acquire the MSS negotiation value on the basis of the TCP handshake packet transmitted between the client terminal and the service terminal.

The construction unit 420 is configured to construct the RST packet according to the suspicious packet and the MSS negotiation value when the suspicious packet is monitored. The RST packet includes the source direction RST packet and the plurality of target direction RST packets. The receiving terminal of the source direction RST packet is the same with the transmitting terminal of the suspicious packet, the receiving terminals of the plurality of target direction RST packets are the same with the receiving terminal of the suspicious packet, and the SEQ values of the plurality of target direction RST packets are sequentially increased by at least one MSS negotiation value.

The interdiction unit 430 is configured to transmit the RST packet to the client terminal and the service terminal respectively to interdict the suspicious packet.

For example, when the suspicious packet is a packet transmitted by the client terminal, the target direction RST packet is transmitted to the service terminal; and when the suspicious packet is a packet transmitted by the service terminal, the target direction RST packet is transmitted to the client terminal.

According to one example, the acquisition unit 410 is configured to execute the following operations:

Acquiring the first MSS value from the first handshake packet SYN packet transmitted to the service terminal by the client terminal;

Acquiring the second MSS value from the second handshake packet ACK packet transmitted to the client terminal by the service terminal; and Selecting the smaller or greater one of the first MSS value and the second MSS value as the MSS negotiation value.

According to one example, the ACK bit of the RST packet is set as 0, and the RST bit is set as 1.

According to one example, the construction unit 420 is configured to execute the following operations:

When the suspicious packet is a packet transmitted by the client terminal, constructing a plurality of first target direction RST packets transmitted to the service terminal and a first source direction RST packet transmitted to the client terminal, wherein the SEQ values of the plurality of first target direction RST packets are the same with the ACK_SEQ value of the suspicious packet; and When the suspicious packet is a packet transmitted by the service terminal, constructing a second source direction RST packet transmitted to the service terminal and a plurality of second target direction RST packets transmitted to the client terminal, wherein the SEQ value of the second source direction RST packet is the same with the ACK_SEQ value of the suspicious packet, and the SEQ values of the plurality of second target direction RST packets are sequentially increased by at least one MSS negotiation value.

According to one example, the interdiction unit 430 is configured to execute the following operations:

When the suspicious packet is a packet transmitted by the client terminal, sequentially transmitting the plurality of first target direction RST packets to the service terminal, and transmitting the first source direction RST packet to the client terminal; and When the suspicious packet is a packet transmitted by the service terminal, sequentially transmitting the plurality of second target direction RST packets to the client terminal, and transmitting the second source direction RST packet to the service terminal.

According to one example, the SEQ values of the plurality of first target direction RST packets are linearly increased.

According to one example, the SEQ values of the plurality of second target direction RST packets are linearly increased.

By taking the software implementation mode as an example, how the TCP bypass interdiction device executes the TCP bypass interdiction control logic 300 is further described hereafter. In the example, the TCP bypass interdiction control logic 300 may be understood as the machine executable instructions stored in the machine readable storage medium 320. When the processor 310 on the TCP bypass interdiction device of the present application executes the TCP bypass interdiction control logic 300, the processor 310 can execute the following operations by invoking the machine executable instructions corresponding to the TCP bypass interdiction control logic 300 stored in the machine readable storage medium 320:

Acquiring the MSS negotiation value on the basis of the TCP handshake packet transmitted between the client terminal and the service terminal;

When the suspicious packet is monitored, constructing the RST packet according to the suspicious packet and the MSS negotiation value, wherein the RST packet includes the source direction RST packet and the plurality of target direction RST packets; the receiving terminal of the source direction RST packet is the same with the transmitting terminal of the suspicious packet; the receiving terminals of the plurality of target direction RST packets are the same with the receiving terminal of the suspicious packet; and the SEQ values of the plurality of target direction RST packets are sequentially increased by at least one MSS negotiation value; and Transmitting the RST packet to the client terminal and the service terminal respectively.

When the suspicious packet is a packet transmitted by the client terminal, the machine executable instructions promote the processor to execute the following operation: transmitting the target direction RST packet to the service terminal; and When the suspicious packet is a packet transmitted by the service terminal, the machine executable instructions promote the processor to execute the following operation: transmitting the target direction RST packet to the client terminal.

According to one example, when acquiring the MSS negotiation value on the basis of the TCP handshake packet transmitted between the client terminal and the service terminal, the machine executable instructions promote the processor to execute the following operations:

Acquiring the first MSS value from the first handshake packet SYN packet transmitted to the service terminal by the client terminal;

Acquiring the second MSS value from the second handshake packet ACK packet transmitted to the client terminal by the service terminal; and Selecting the smaller or greater one of the first MSS value and the second MSS value as the MSS negotiation value.

According to one example, the ACK bit of the RST packet is set as 0, and the RST bit is set as 1.

According to one example, when constructing the RST packet according to the suspicious packet and the MSS negotiation value, the machine executable instructions promote the processor to execute the following operations:

When the suspicious packet is a packet transmitted by the client terminal, constructing the plurality of first target direction RST packets transmitted to the service terminal and the first source direction RST packet transmitted to the client terminal, wherein the SEQ values of the plurality of first target direction RST packets are sequentially increased by at least one MSS negotiation value, and the SEQ value of the first source direction RST packets is the same with the ACK_SEQ value of the suspicious packet; and When the suspicious packet is a packet transmitted by the service terminal, constructing the second source direction RST packet transmitted to the service terminal and the plurality of second target direction RST packets transmitted to the client terminal, wherein the SEQ value of the second source direction RST packet is the same with the ACK_SEQ value of the suspicious packet, and the SEQ values of the plurality of second target direction RST packets are sequentially increased by at least one MSS negotiation value.

According to one example, when transmitting the RST packet to the client terminal and the service terminal respectively, the machine executable instructions promote the processor to execute the following operations:

When the suspicious packet is a packet transmitted by the client terminal, sequentially transmitting the plurality of first target direction RST packets to the service terminal, and transmitting the first source direction RST packet to the client terminal; and When the suspicious packet is a packet transmitted by the service terminal, sequentially transmitting the plurality of second target direction RST packets to the client terminal, and transmitting the second source direction RST packet to the service terminal.

According to one example, the SEQ values of the plurality of first target direction RST packets are linearly increased.

According to one example, the SEQ values of the second target direction RST packets are linearly increased.

The specific function and effect implementation processes of each unit of the device can see the implementation processes of corresponding steps of the method, so unnecessary details will not be repeated here any more.

The TCP bypass interdiction device acquires the MSS negotiation value from the acquired packet after acquiring the TCP handshake packet transmitted between the client terminal and the service terminal. When the suspicious packet is monitored, the device constructs the RST packet according to the MSS negotiation value and the suspicious packet, and then transmits the RST packet to the client terminal and the service terminal respectively to interdict the suspicious packet. The device may transmit a plurality of RST packets to the client terminal and the service terminal respectively, thus effectively solving the problem of low interdiction success rate.

The descriptions above are only preferable embodiments of the present application, which are not used to restrict the present application. Any amendments, equivalent substitutions, improvements and the like within the spirit and principle of the present application are all concluded in the protection scope of the present application.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A TCP (transmission control protocol) bypass interdiction method, comprising:
   a DPI (deep packet inspection) device located between a client terminal and a service terminal acquiring an MSS (maximum segment size) negotiation value on the basis of a TCP handshake packet transmitted between the client terminal and the service terminal;
   when a suspicious packet is monitored, the DPI device constructing an RST (reset) packet according to the suspicious packet and the MSS negotiation value, the RST packet comprising a source direction RST packet and a plurality of target direction RST packets, a receiving terminal of the source direction RST packet being the same with a transmitting terminal of the suspicious packet, a plurality of receiving terminals of the plurality of target direction RST packets being the same with a receiving terminal of the suspicious packet, and a plurality of SEQ (sequence) values of the plurality of target direction RST packets being sequentially increased by at least one MSS negotiation value; and
   the DPI device transmitting the RST packet to the client terminal and the service terminal respectively.

2. The TCP bypass interdiction method of claim 1, wherein,
   when the suspicious packet is a packet transmitted by the client terminal, the DPI device transmits the plurality of target direction RST packets to the service terminal; and
   when the suspicious packet is a packet transmitted by the service terminal, the DPI device transmits the plurality of target direction RST packets to the client terminal.

3. The TCP bypass interdiction method of claim 1, wherein the acquiring the MSS negotiation value on the basis of the TCP handshake packet transmitted between the client terminal and the service terminal, comprises:
   acquiring a first MSS value from a first handshake packet SYN (synchronous) packet transmitted to the service terminal by the client terminal;
   acquiring a second MSS value from a second handshake packet ACK (acknowledgement) packet transmitted to the client terminal by the service terminal; and
   selecting a smaller one of the first MSS value and the second MSS value as the MSS negotiation value.

4. The TCP bypass interdiction method of claim 1, wherein the acquiring the MSS negotiation value on the basis of the TCP handshake packet transmitted between the client terminal and the service terminal, comprises:
   acquiring a first MSS value from a first handshake packet SYN (synchronous) packet transmitted to the service terminal by the client terminal;
   acquiring a second MSS value from a second handshake packet ACK (acknowledgement) packet transmitted to the client terminal by the service terminal; and
   selecting a greater one of the first MSS value and the second MSS value as the MSS negotiation value.

5. The TCP bypass interdiction method of claim 1, wherein an ACK (acknowledgement) bit of the RST packet is set as 0, and an RST bit of the RST packet is set as 1.

6. The TCP bypass interdiction method of claim 1, wherein the constructing the RST packet according to the suspicious packet and the MSS negotiation value, comprises:

when the suspicious packet is a packet transmitted by the client terminal, constructing a plurality of first target direction RST packets transmitted to the service terminal and a first source direction RST packet transmitted to the client terminal, wherein a plurality of SEQ values of the plurality of first target direction RST packets is sequentially increased by at least one MSS negotiation value, and an SEQ value of the first source direction RST packet is the same with an ACK_SEQ value of the suspicious packet; and when the suspicious packet is a packet transmitted by the service terminal, constructing a second source direction RST packet transmitted to the service terminal and a plurality of second target direction RST packets transmitted to the client terminal, wherein an SEQ value of the second source direction RST packet is the same with an ACK_SEQ value of the suspicious packet, and a plurality of SEQ values of the plurality of second target direction RST packets is sequentially increased by at least one MSS negotiation value.

7. The TCP bypass interdiction method of claim 6, wherein the transmitting the RST packet to the client terminal and the service terminal respectively, comprises:

when the suspicious packet is a packet transmitted by the client terminal, sequentially transmitting the plurality of first target direction RST packets to the service terminal, and transmitting the first source direction RST packet to the client terminal; and when the suspicious packet is a packet transmitted by the service terminal, sequentially transmitting the plurality of second target direction RST packets to the client terminal, and transmitting the second source direction RST packet to the service terminal.

8. The TCP bypass interdiction method of claim 6, wherein the plurality of SEQ values of the plurality of first target direction RST packets is linearly increased.

9. The method of claim 6, wherein the plurality of SEQ values of the plurality of second target direction RST packets is linearly increased.

10. A TCP (transmission control protocol) bypass interdiction device, located between a client terminal and a service terminal, comprising:

a non-transitory machine readable storage medium, and a processor executing the following operations by reading machine executable instructions corresponding to a TCP bypass interdiction control logic from the machine readable storage medium and executing the machine executable instructions:

acquiring an MSS (maximum segment size) negotiation value on the basis of a TCP handshake packet transmitted between the client terminal and the service terminal;

when a suspicious packet is monitored, constructing an RST (reset) packet according to the suspicious packet and the MSS negotiation value, the RST packet including a source direction RST packet and a plurality of target direction RST packets, a receiving terminal of the source direction RST packet being the same with a transmitting terminal of the suspicious packet, a receiving terminal of the plurality of target direction RST packets being the same with a receiving terminal of the suspicious packet, and a plurality of SEQ (sequence) values of the plurality of target direction RST packets being sequentially increased by at least one MSS negotiation value; and transmitting the RST packet to the client terminal and the service terminal respectively.

11. The TCP bypass interdiction device of claim 10, wherein, when the suspicious packet is a packet transmitted by the client terminal, the machine executable instructions promote the processor to execute the following operation: transmitting the plurality of target direction RST packets to the service terminal; and when the suspicious packet is a packet transmitted by the service terminal, the machine executable instructions promote the processor to execute the following operation: transmitting the plurality of target direction RST packets to the client terminal.

12. The TCP bypass interdiction device of claim 10, wherein when acquiring the MSS negotiation value on the basis of the TCP handshake packet transmitted between the client terminal and the service terminal, the machine executable instructions promote the processor to execute the following operations:

acquiring a first MSS value from a first handshake packet SYN (synchronous) packet transmitted to the service terminal by the client terminal;

acquiring a second MSS value from a second handshake packet ACK (acknowledgement) packet transmitted to the client terminal by the service terminal; and selecting a smaller one of the first MSS value and the second MSS value as the MSS negotiation value.

13. The TCP bypass interdiction device of claim 10, wherein when acquiring the MSS negotiation value on the basis of the TCP handshake packet transmitted between the client terminal and the service terminal, the machine executable instructions promote the processor to execute the following operations:

acquiring a first MSS value from a first handshake packet SYN (synchronous) packet transmitted to the service terminal by the client terminal;

acquiring a second MSS value from a second handshake packet ACK (acknowledgement) packet transmitted to the client terminal by the service terminal; and selecting a greater one of the first MSS value and the second MSS value as the MSS negotiation value.

14. The TCP bypass interdiction device of claim 10, wherein an ACK (acknowledgement) bit of the RST packet is set as 0, and an RST bit of the RST packet is set as 1.

15. The TCP bypass interdiction device of claim 10, wherein when constructing the RST packet according to the suspicious packet and the MSS negotiation value, the machine executable instructions promote the processor to execute the following operations:

when the suspicious packet is a packet transmitted by the client terminal, constructing a plurality of first target direction RST packets transmitted to the service terminal and a first source direction RST packet transmitted to the client terminal, wherein a plurality of SEQ values of the plurality of first target direction RST packets is sequentially increased by at least one MSS negotiation value, and a SEQ value of the first source direction RST packet is the same with an ACK_SEQ value of the suspicious packet; and when the suspicious packet is a packet transmitted by the service terminal, constructing a second source direction RST packet transmitted to the service terminal and a plurality of second target direction RST packets transmitted to the client terminal, wherein a SEQ value of the second source direction RST packet is the same with an ACK_SEQ value of the suspicious packet, and a plurality of SEQ values of the plurality of second target direction RST packets is sequentially increased by at least one MSS negotiation value.

16. The TCP bypass interdiction device of claim 15, wherein when transmitting the RST packet to the client terminal and the service terminal respectively, the machine executable instructions promote the processor to execute the following operations:

when the suspicious packet is a packet transmitted by the client terminal, sequentially transmitting the plurality of first target direction RST packets to the service terminal, and transmitting the first source direction RST packet to the client terminal; and when the suspicious packet is a packet transmitted by the service terminal, sequentially transmitting the plurality of second target direction RST packets to the client terminal, and transmitting the second source direction RST packet to the service terminal.

17. The TCP bypass interdiction device of claim 15, wherein the plurality of SEQ values of the plurality of first target direction RST packets is linearly increased.

18. The TCP bypass interdiction device of claim 15, wherein the plurality of SEQ values of the plurality of second target direction RST packets is linearly increased.

* * * * *